Figure 1:
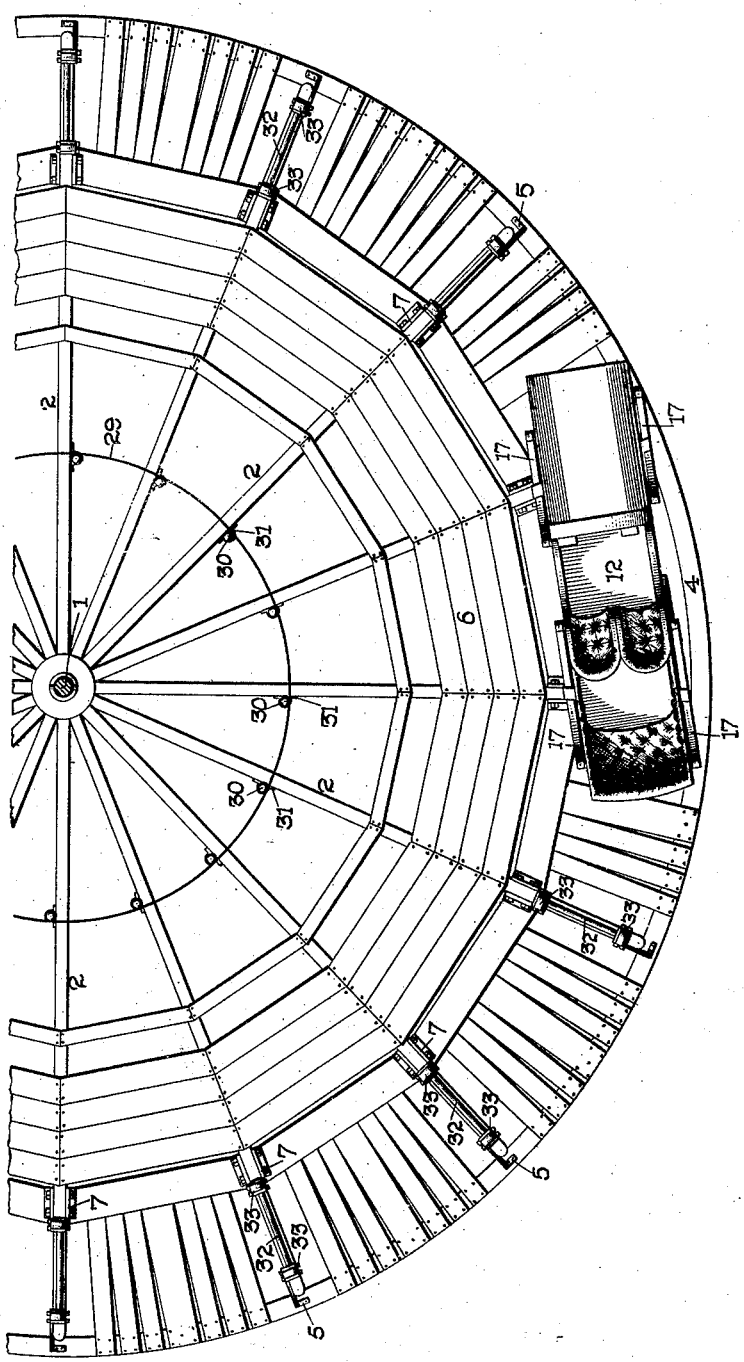

E. O. SPILLMAN.
MERRY-GO-ROUND.
APPLICATION FILED MAY 10, 1905.

987,023.

Patented Mar. 14, 1911.
4 SHEETS—SHEET 1.

Witnesses.
L. M. Sangster
Geo. A. Neubauer.

Edward O. Spillman Inventor
By A. Sangster Attorney.

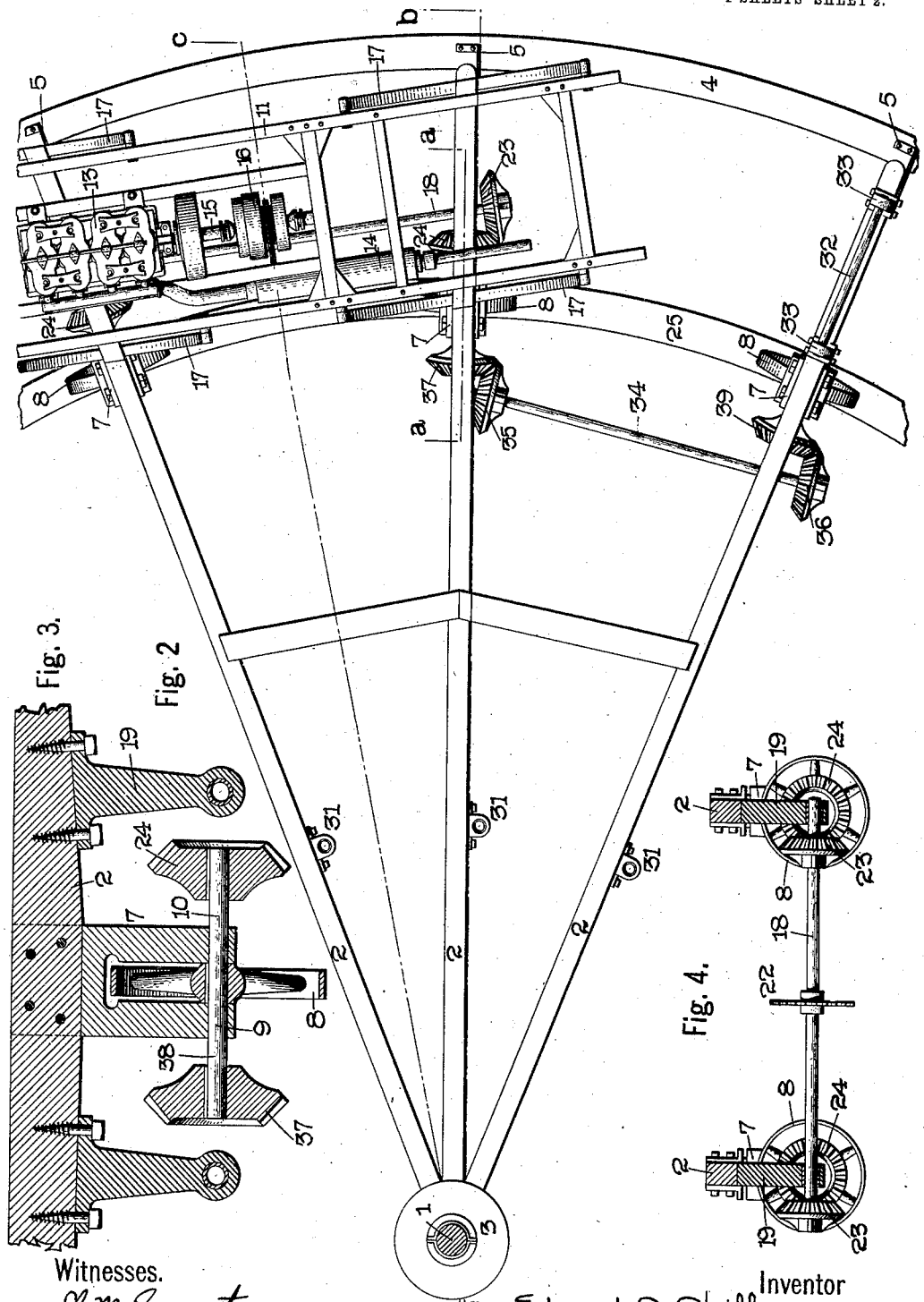

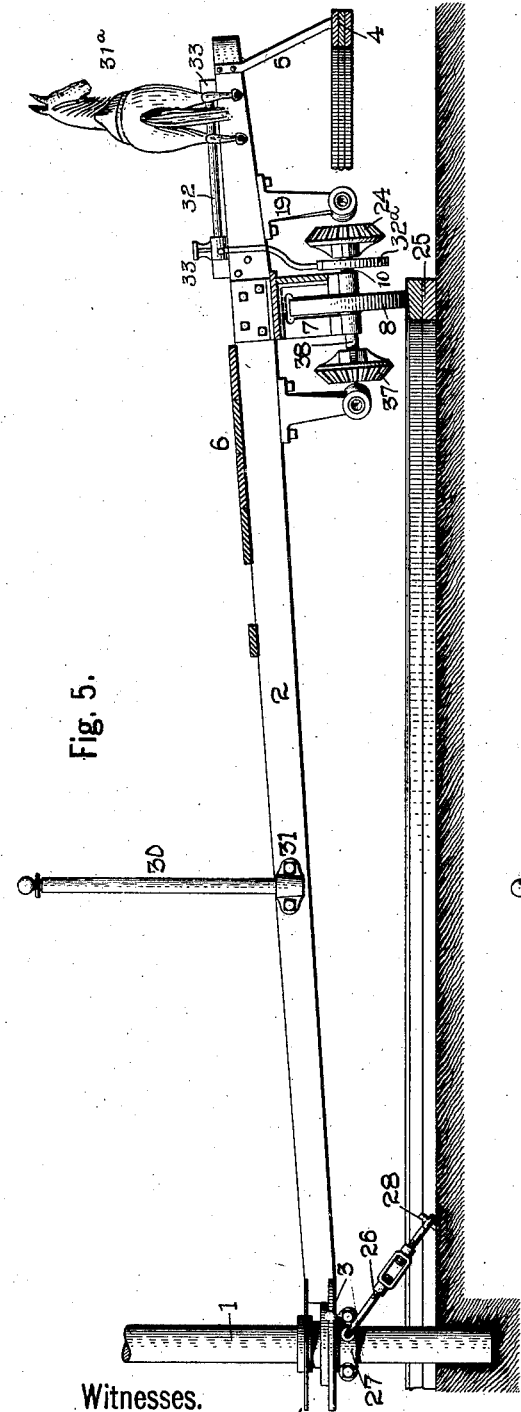
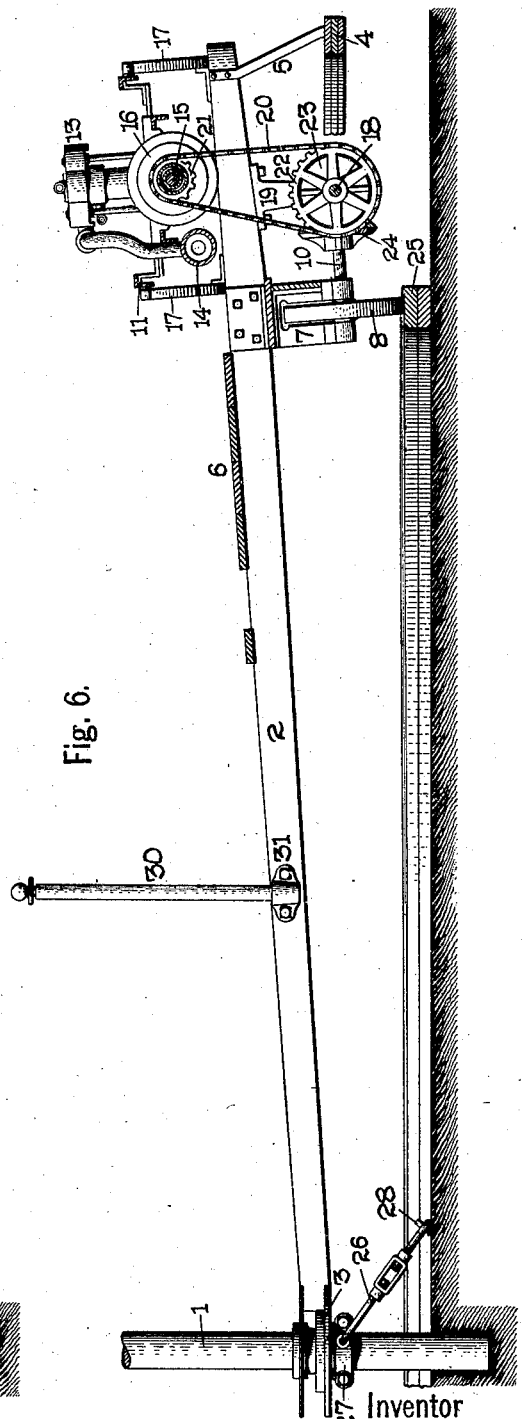

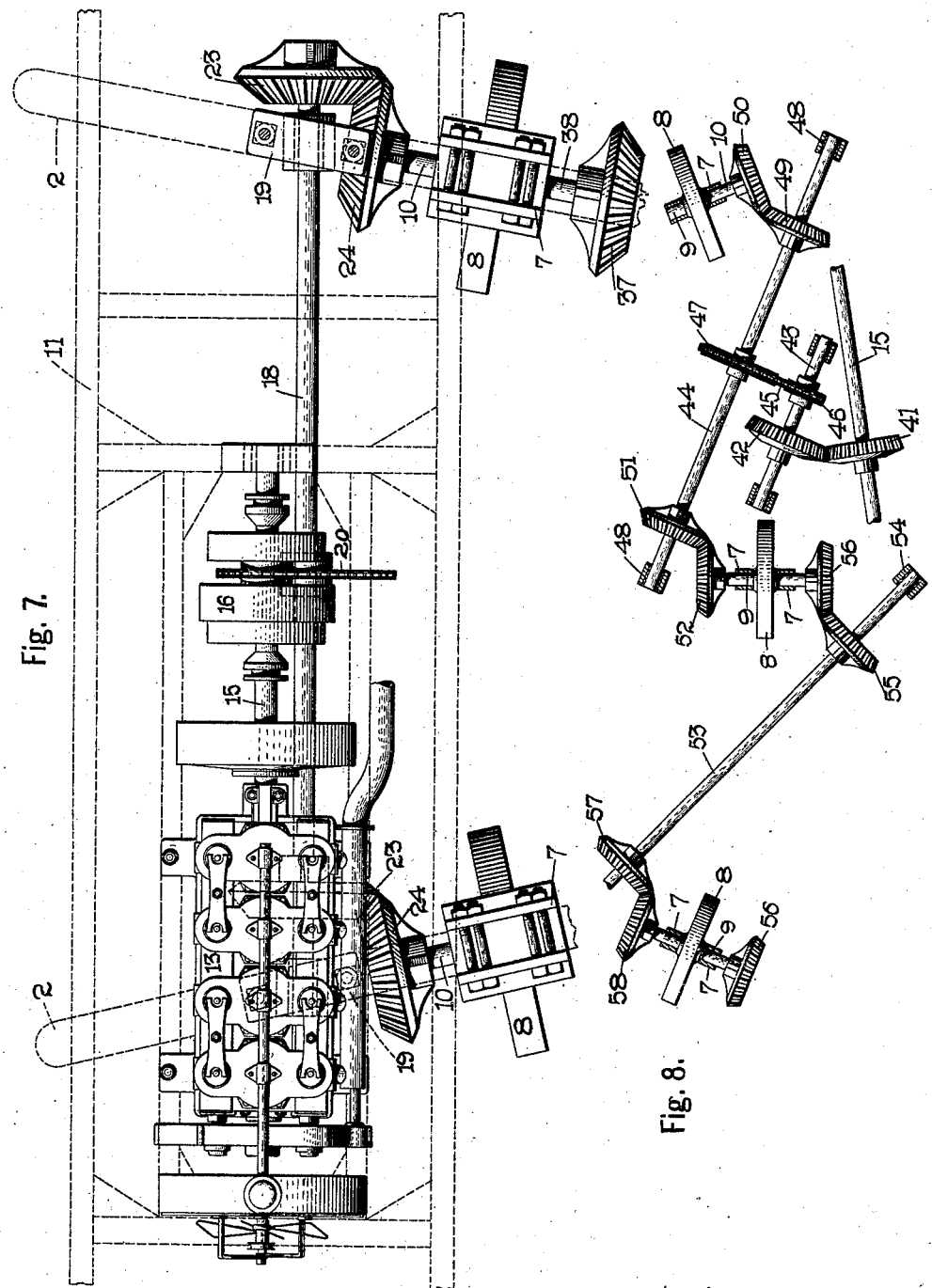

UNITED STATES PATENT OFFICE.

EDWARD O. SPILLMAN, OF NORTH TONAWANDA, NEW YORK, ASSIGNOR TO HERSCHELL SPILLMAN COMPANY, OF NORTH TONAWANDA, NEW YORK.

MERRY-GO-ROUND.

987,023.  Specification of Letters Patent.  Patented Mar. 14, 1911.

Application filed May 10, 1905. Serial No. 259,724.

*To all whom it may concern:*

Be it known that I, EDWARD O. SPILLMAN, a citizen of the United States, residing at North Tonawanda, in the county of Niagara and State of New York, have invented certain new and useful Improvements in Merry-Go-Rounds, of which the following is a specification.

This invention relates to an improved merry-go-round in which an automobile is mounted or supported directly upon the merry-go-round, thereby dispensing with the stationary steam engine and the connecting cable and gearing usually employed.

The principal object of the invention is to provide means whereby the frame, body, motor and springs of an automobile of the usual and well known type can be mounted upon and used to operate a merry-go-round by simply removing the wheels, axles and the steering and connecting gear and connecting the driving axle of the motor or engine of the automobile to one or more of the supporting wheels of the merry-go-round.

The invention also relates to certain details of construction, all of which will be fully and clearly hereinafter described and claimed, reference being had to the accompanying drawings, in which,—

Figure 1 is a plan view of one-half of a merry-go-round constructed in accordance with this invention, the usual carriages and horses being omitted. Fig. 2 is an enlarged fragmentary top plan view of the merry-go-round, the body of the automobile, the walks and platform being omitted to show the driving gear. Fig. 3 is an enlarged central vertical section through one of the sweeps and the depending brackets on line *a a*, Fig. 2. Fig. 4 is a transverse section through two of the sweeps, showing the countershaft and the intermeshing gears for connecting the countershaft and the shafts of the wheels. Fig. 5 is a section on line *b b*, Fig. 2, the automobile and the countershaft being omitted. Fig. 6 is a section on line *c c*, Fig. 2, showing the sprocket and chain connection between the driving shaft of the automobile and the countershaft, the body of the automobile being omitted. Fig. 7 is an enlarged top plan view of the automobile engine, the transmission gear, the countershaft, and the intermeshing gearing; the automobile frame and two of the sweeps being shown in dotted lines. Fig. 8 is a plan view of another form of gearing for driving the merry-go-round.

In the preferred adaptation of the invention shown in detail in the accompanying drawings, like numerals designate like parts.

The merry-go-round proper comprises a center pole 1, a series of sweeps 2, radiating from a bearing block 3, rotatably supported on said pole and a circular guard ring 4, extending around and beneath the outer extremities of the sweeps 2, and supported therefrom by rods 5. The usual riding figures and cars, (not shown) are supported in the well known way upon the sweeps. The usual walk 6, is provided for the convenience of the operator for collecting fares and other purposes.

Each of the sweeps is provided with a depending bifurcated bracket 7, between the forks of which a wheel 8, is journaled on a shaft 9. One or more of the shafts 9, are provided with outwardly extending portions 10, carrying gearing by which the merry-go-round is driven by the motor or engine as will be more specifically set forth farther on. The type of driving motor shown in the drawings comprises an automobile of any well known style having the usual frame 11, body 12, gasolene or other explosive engine 13, muffler 14, driving shaft 15, transmission gearing 16, and springs 17, which are fastened directly to the sweeps so that the automobile is yieldingly supported from the merry-go-round and rotates in unison with it. The motor of the automobile with its connecting mechanism serves to drive the merry-go-round while the body furnishes a seat for the operator and also provides seating accommodation for passengers. A countershaft 18, is journaled in bearings 19, bolted to and depending from the sweeps and extends parallel to the driving shaft 15, to which it is connected by a chain 20, encircling the sprocket wheels 21 and 22, mounted respectively on the driving shaft 15, and countershaft 18. A bevel gear 23, is mounted on each end of the countershaft 18, which meshes with a bevel gear 24, mounted on the outwardly extending portions 10, of the long shafts 9.

The wheels 8, travel on a circular track 25, which is supported beneath the body proper of the merry-go-round. The pole 1, is supported in position by a series of two part extensible rods 26, which are fastened at their respective ends to a collar 27, mounted on the pole 1, and pins 28, which are driven into the ground.

A canvas or the like 29, having a panorama thereon is supported in annular position around the pole 1, by a series of vertical standards 30, each of which is supported by fitting its lower end into a socket 31, attached to one of the sweeps.

The riding figures 31ª, are rocked by mounting them on a rock shaft 32, in the usual way as shown in Fig. 5. Each rock shaft 32, is arranged parallel to and vertically above one of the sweeps near the outer end thereof and is journaled at its ends in bearings 33, mounted on the sweep. The shafts 32, are rocked by eccentrics 32ª mounted on the shafts 9 and 10.

If it is desired more than two wheels 8, can be connected to the automobile by gearing to serve as driving wheels.

In Fig. 2, supplementary gearing is illustrated consisting of a shaft 34, having two bevel gears 35 and 36, one at each end, a bevel gear 37, mounted on an inwardly projecting extension 38, of one of the shafts 9, of one of the wheels 8, and meshing with the bevel gear 35, and a bevel gear 39, mounted on an inwardly projecting extension of the shaft of an adjacent wheel 8. By means of connecting gearing of this character three or more wheels can be rotated from the automobile to serve as driving wheels for the merry-go-round. Another form of connecting gearing is shown in Fig. 8, which consists of one or more diagonally extending shafts which have bevel gear wheels meshing with bevel gears on the shafts of the wheels 8.

The driving shaft 15, of the motor has a bevel gear 41, which meshes with a bevel gear 42, on an intermediate shaft 43. This shaft 43, extends parallel with the countershaft 44, and is connected therewith by a sprocket chain 45, which passes over sprockets 46 and 47, on the shafts 43 and 44. This countershaft 44, is supported in brackets 48, depending from the sweeps and has a bevel gear 49, at one end which meshes with a bevel gear 50, mounted upon the projecting end 10, of one of the shafts 9. Another bevel gear 51, is mounted upon the other end of the shaft 44, and meshes with a bevel gear 52, mounted upon the inwardly projecting end of the shaft 9, of the adjacent wheel 8.

Two or more of the wheels 8, can be connected with each other so as to be driven from the driving shaft 15.

A diagonally extending shaft 53, is mounted in brackets 54, depending from the sweeps and has a bevel gear 55, near its outer end which meshes with a bevel gear 56, upon the outer projecting end 10, of the shaft 9, upon which the gear 52, is mounted.

A bevel gear 57, is mounted upon the shaft 53, near its other end, which meshes with a bevel gear 58, mounted upon the inwardly projecting end of the shaft 9, of the next wheel 8.

The automobile serves both as a driving medium and as a passenger carrier.

The great advantages of this invention over the old style are in the simplicity of the construction by dispensing with the stationary engine, the connecting cable and other necessary gearing and parts, the economy of operation, the ease of manipulation by an operator sitting in the automobile and starting and stopping the merry-go-round by starting and stopping the automobile. Another advantage is that the automobile is mounted on the outer portion of the merry-go-round and in proximity to the driving wheels of the merry-go-round. The arrangement is such that the only change required is to disconnect and remove the wheels and axles and the steering gear from the automobile and connect the driving shaft to one or more of the supporting wheels.

I claim as my invention.

1. The combination with a merry-go-round having a supporting platform for passengers, a series of supporting wheels, shafts journaled beneath the platform on which the wheels are mounted and a bevel gear wheel on one of said shafts, of a frame mounted on the supporting platform of the merry-go-round, a body of conventional automobile form mounted on said frame, a driving motor mounted in the front portion of said frame, a longitudinal shaft extending rearward from the motor, a counter shaft journaled in depending bearings beneath the platform, and extending in parallelism with the motor shaft, a bevel gear wheel on the counter shaft meshing with the bevel gear wheel on the supporting wheel shaft and a connection between the motor shaft and the counter shaft, substantially as set forth.

2. The combination with a merry-go-round having a series of radial sweeps, supporting wheels journaled in brackets depending from near the outer ends of the sweeps, and a circular supporting platform, of a body of conventional automobile form mounted upon the supporting platform, a motor carried by said body and connected by gearing to at least one of the supporting wheels, a driving shaft extending from the motor and having a sprocket, a counter shaft extending in parallelism with the driving shaft journaled beneath the platform and having a sprocket, a chain encircling the sprockets of the driving shaft and counter shaft, and gearing connecting the countershaft to one of the supporting wheels.

3. The combination with a merry-goround having a series of radial sweeps, supporting wheels journaled in brackets depending from near the outer ends of the sweeps, a bevel gear on the shaft of one of the supporting wheels and a circular supporting platform, of a body of conventional automobile form mounted upon the supporting platform, a motor carried by said body and connected by gearing to at least one of the supporting wheels, a driving shaft extending from the motor and having a sprocket, a counter shaft extending in parallelism with the driving shaft journaled beneath the platform and having a sprocket, a cabin encircling the sprockets of the driving shaft and counter shaft and a bevel gear at one end of the countershaft meshing with the bevel gear on the supporting wheel, substantially as set forth.

EDWARD O. SPILLMAN.

Witnesses:
L. M. SANGSTER,
GEO. A. NEUBAUER.

Copies of this patent may be obtained for five cents each, by addressing the "Commissioner of Patents. Washington, D. C."